United States Patent
Kanechika et al.

(10) Patent No.: US 12,109,932 B2
(45) Date of Patent: Oct. 8, 2024

(54) LAMP DEVICE

(71) Applicant: STANLEY ELECTRIC CO., LTD., Tokyo (JP)

(72) Inventors: Masayuki Kanechika, Tokyo (JP); Takashi Sato, Tokyo (JP); Minoru Yamaguchi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 340 days.

(21) Appl. No.: 17/786,530

(22) PCT Filed: Dec. 10, 2020

(86) PCT No.: PCT/JP2020/046046
§ 371 (c)(1),
(2) Date: Jun. 17, 2022

(87) PCT Pub. No.: WO2021/125044
PCT Pub. Date: Jun. 24, 2021

(65) Prior Publication Data
US 2023/0038282 A1     Feb. 9, 2023

(30) Foreign Application Priority Data
Dec. 20, 2019  (JP) ................. 2019-230693
Nov. 19, 2020  (JP) ................. 2020-192516

(51) Int. Cl.
*B60Q 1/00*       (2006.01)
*G01S 7/02*       (2006.01)
*G01S 13/931*     (2020.01)
*H01Q 1/32*       (2006.01)
*H01Q 1/42*       (2006.01)

(52) U.S. Cl.
CPC ............ *B60Q 1/0023* (2013.01); *G01S 7/028* (2021.05); *G01S 13/931* (2013.01); *H01Q 1/3233* (2013.01); *H01Q 1/42* (2013.01); *G01S 2013/9327* (2020.01)

(58) Field of Classification Search
None
See application file for complete search history.

(56) References Cited

U.S. PATENT DOCUMENTS 10,754,026 B2 *  8/2020  Callewaert ............. G01S 13/88
2008/0180965 A1  7/2008  Nakamura et al.
(Continued)

FOREIGN PATENT DOCUMENTS

DE  102011115829 A1  4/2013
JP  10-150316 A      6/1998
(Continued)

OTHER PUBLICATIONS

Extended European Search Report issued Dec. 21, 2022 in corresponding European Patent Application No. 20902028.8, 10 pages.
(Continued)

*Primary Examiner* — Ashok Patel
(74) *Attorney, Agent, or Firm* — XSENSUS LLP

(57) ABSTRACT

A lamp device includes: a lamp unit; a radar unit having an antenna; and a shielding member which covers at least a part of the front surface of the radar unit where the antenna is provided and which is made of a foamed resin.

13 Claims, 4 Drawing Sheets

(56) References Cited

U.S. PATENT DOCUMENTS

| | | | |
|---|---|---|---|
| 2017/0263999 A1 | 9/2017 | Miyoshi et al. | |
| 2018/0131099 A1* | 5/2018 | Geary | H01Q 1/42 |

FOREIGN PATENT DOCUMENTS

| | | | |
|---|---|---|---|
| JP | 2006-140956 A | 6/2006 | |
| JP | 2008-186741 A | 8/2008 | |
| JP | 2010-010100 A | 1/2010 | |
| JP | 2010-135087 A | 6/2010 | |
| JP | 2010-230661 A | 10/2010 | |
| JP | 4842161 B2 | 12/2011 | |
| JP | 2017-161431 A | 9/2017 | |
| JP | 2019-23625 A | 2/2019 | |
| JP | 6579028 B2 | 9/2019 | |
| KR | 10-2018-0008203 A | 1/2018 | |
| WO | 2019/021693 A1 | 1/2019 | |
| WO | 2019/130237 A1 | 7/2019 | |
| WO | WO_2021024887 | * 10/2021 | |

OTHER PUBLICATIONS

International Search Report and Written Opinion mailed on Jan. 12, 2021, received for PCT Application PCT/JP2020/046046, filed on Dec. 10, 2020, 12 pages including English Translation.

Office Action issued on Jun. 4, 2024, in corresponding Japanese patent Application No. 2023-113028, 8 pages.

\* cited by examiner

LAMP DEVICE

CROSS-REFERENCE TO RELATED APPLICATIONS

The present application is based on PCT filing PCT/JP2020/046046, filed Dec. 10, 2020, which claims priority to JP 2019-230693, filed Dec. 20, 2019, and JP 2020-192516, filed Nov. 19, 2020, the entire contents of each are incorporated herein by reference.

TECHNICAL FIELD

The present invention relates to a lamp device, and more particularly to a lamp device that is mounted on a vehicle and includes a radar unit.

BACKGROUND ART

For driver assistance and automated driving, various sensors such as cameras, LiDAR (Light Detection and Ranging), and millimeter wave sensors are used in addition to acceleration sensors and GPS sensors.

In particular, millimeter wave radars are not affected by environmental factors such as nighttime and backlighting, and bad weather such as heavy fog, rainfall and snowfall, and maintain high performance of detecting objects. In addition, millimeter wave radars can directly detect the distance to and the direction of an object and the speed relative to the object. Thus, millimeter wave radars are characterized by having the capability of detecting even a short-distance object at high speed and with high accuracy.

There has been proposed a vehicle light fixture in which a millimeter wave radar is mounted in a light chamber and a light guide member that transmits millimeter waves is provided between a front cover and the millimeter wave radar (e.g., Patent Literature 1).

CITATION LIST

Patent Literature

Patent Literature 1: Japanese Patent No. 4842161

SUMMARY OF INVENTION

Technical Problem

However, when the light guide member is placed in front of the millimeter wave radar, the electromagnetic waves emitted from the millimeter wave radar are reflected and absorbed by the light guide member due to the influences of the dielectric constant or the dielectric loss tangent of the light guide member, causing the radiated power of the radiated electromagnetic waves to be reduced, with resultant significant deterioration of the detection performance of the millimeter wave radar.

Therefore, although an external appearance can be improved by, for example, making the millimeter wave radar invisible from the outside by using a light guide member (a light guide rod or the like), which is normally used for an automobile headlight, this has been a cause of loss of a radar function.

The present invention has been made in view of the above, and an object of the invention is to provide a lamp device which has a radar unit and an extension placed in front of the electromagnetic wave radiation surface of the radar unit but can effectively suppress the attenuation or reflection and multiple reflection of a radar wave, and has a high-accuracy radar function such as low noise and a wide dynamic range.

Another object of the present invention is to provide a lamp device having an extension that makes it difficult to visually recognize a radar unit from the outside without changing the radiation pattern of a radar wave.

Solution to Problem

A lamp device according to a first embodiment of the present invention is a lamp device that includes:
a lamp unit; a radar unit having an antenna; and a shielding member which covers at least a part of the front surface of the radar unit where the antenna is provided, and which is made of a foamed resin.

A lamp device according to another embodiment of the present invention is:
a lamp device including a lamp unit, a radar unit that radiates an electromagnetic wave, and a transparent cover, the lamp device including:
a shielding member which is disposed between the transparent cover and an electromagnetic wave radiation surface of the radar unit, covers at least a part of a front surface of the radar unit, and is made of a foamed resin;
wherein a thickness TK of an electromagnetic wave radiation surface correspondence area that corresponds to the electromagnetic wave radiation surface of the transparent cover is set such that a reflection loss of the electromagnetic wave incident upon the electromagnetic wave radiation surface correspondence area of the transparent cover is −10 dB or less,
a thickness TG of the shielding member is set such that a reflection loss of the electromagnetic wave incident upon the shielding member is −10 dB or less, and
an interval C1 between the electromagnetic wave radiation surface correspondence area and the shielding member is set such that the reflection loss of the electromagnetic wave incident upon the electromagnetic wave radiation surface correspondence area and the shielding member is −10 dB or less.

DESCRIPTION OF EMBODIMENTS

Figure 1:
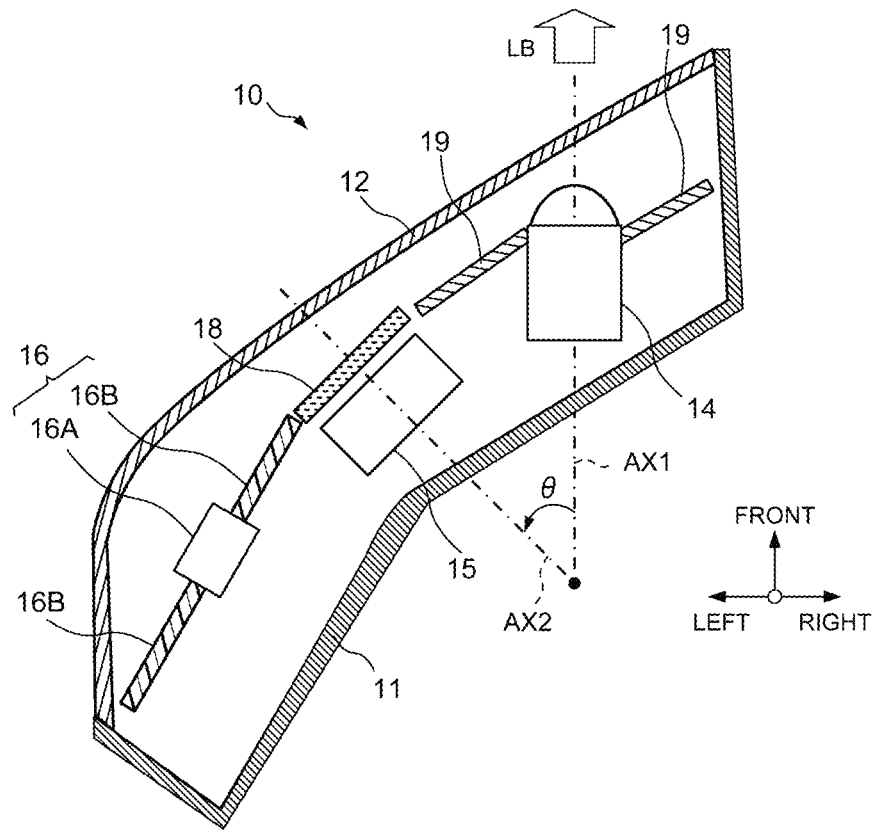
FIG. 1 is a diagram schematically illustrating an example of the internal structure of a lamp device according to a first embodiment of the present invention.

In the following, preferred embodiments of the present invention will be described, but these may be modified or combined as appropriate and then applied. Further, in the following description and the accompanying drawings, substantially the same or equivalent parts will be described with the same reference numerals.

FIG. 1 is a diagram schematically illustrating an example of the internal structure of a lamp device 10 of a first embodiment according to the present invention. The lamp device 10 is, for example, a headlight mounted on a vehicle such as an automobile. FIG. 1 schematically illustrates the section in a horizontal plane (or a plane parallel to a road surface) of the lamp device 10 mounted on the front left of the vehicle (left headlight) when viewed from above.

In the lamp device 10, a lamp enclosure (housing) is composed of a base body 11 and a transparent cover 12 held on the base body 11. The lamp enclosure includes therein a headlight unit 14, which is a lamp unit (light source unit), a millimeter wave radar unit 15, which is a radar unit, a light emitting unit 16, a shielding member 18, and extensions 19. The shielding member 18 is a kind of an extension member that makes it difficult for the millimeter wave radar unit 15 to be visually recognized from the outside. In the present specification, a device composed of the radar unit 15 and the shielding member 18 will be referred to as a radar device.

In the present specification, the lamp unit is not limited to a headlight light source, but refers to a light emitting source having a purpose or a function of emitting light toward the outside, such as a taillight, a backlight or the like.

The headlight unit 14 has a light source such as an LED (Light Emitting Diode), and a lens or a reflector for distributing and irradiating the light from the light source. The headlight unit 14 is placed along an optical axis AX1 and is provided such that irradiation light LB of a low beam (passing beam) and a high beam (driving beam) is irradiated in a forward (FRONT in the drawing) direction.

The millimeter wave radar unit 15 has, on the front surface thereof, a transmitting/receiving surface on which a millimeter wave transmitting/receiving antenna is provided. In the present specification, the transmitting/receiving surface of the millimeter wave radar unit 15 (the front surface of the millimeter wave radar unit 15) is referred to also as the antenna surface.

Figure 2:
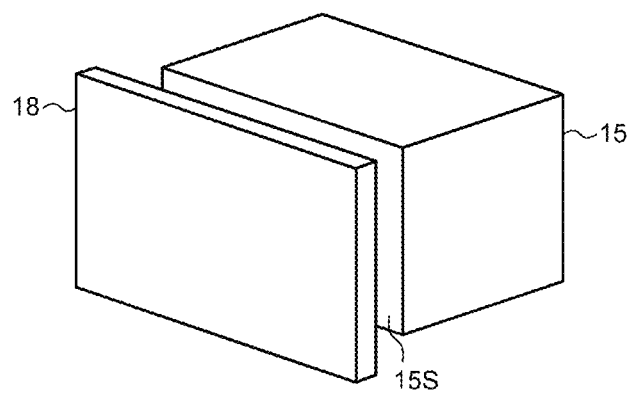
FIG. 2 is a perspective view illustrating the placement of a millimeter wave radar unit 15 and a shielding member 18.

More specifically, the millimeter wave radar unit 15 has a transmitting antenna and a receiving antenna on the transmitting/receiving surface (electromagnetic wave radiation surface) 15S (refer to FIG. 2). The millimeter wave radar unit 15 radiates electromagnetic waves (millimeter waves) from the transmitting antenna and receives, by the receiving antenna, the reflection waves reflected by an object. A received signal is subjected to signal processing by a controller such as an ECU (Electronic Control Unit), which is not illustrated, so as to detect the distance to, the angle, and the speed of the object. For the millimeter wave radar unit 15, millimeter waves in, for example, a 76 to 81 GHz band, especially millimeter waves in a 79 GHz band, are used; however, the frequency band is not limited thereto. Further, the antenna may function to perform both transmission and reception.

The light emitting unit 16 has a light source 16A and a light guide body 16B composed of at least one light guide member that guides the light from the light source 16A. The light emitting unit 16 functions as a DRL (Daytime Running Lights) or a turn lamp. The light source 16A has, for example, an LED, an incandescent light bulb, or the like and supplies the light thereof to the light guide body 16B.

A normal-line direction AX2 of the antenna surface 15S of the millimeter wave radar unit 15 is set to incline by an angle θ (45° in the present embodiment) in the outside direction of the vehicle (i.e., the left direction in the case of a left headlight) with respect to the optical axis AX1 of the headlight unit 14.

The shielding member 18 that is placed with a gap from the antenna surface 15S and covers the antenna surface 15S is provided adjacent to the antenna surface 15S of the millimeter wave radar unit 15. Further, at least one extension 19 is provided in the lamp enclosure. The extension 19 is a design component provided to reflect light or guide light, or make it difficult for an internal structure or the like to be visually recognized from the outside.

Figure 3A:
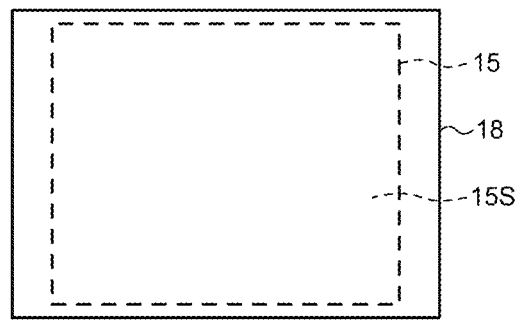
FIG. 3A is a diagram illustrating the shielding member 18 viewed from an antenna surface 15S side of the millimeter wave radar unit 15.
Figure 3B:
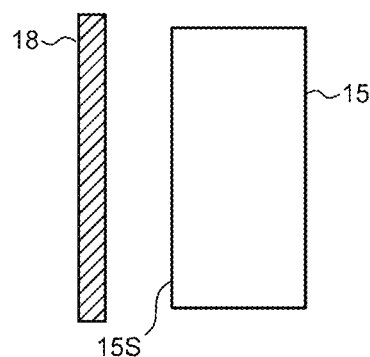
FIG. 3B is a diagram schematically illustrating the sections of the millimeter wave radar unit 15 and the shielding member 18.

FIG. 2 is a perspective view illustrating the placement of the millimeter wave radar unit 15 and the shielding member 18. FIG. 3A is a diagram illustrating the shielding member 18 viewed from the side of an antenna surface 15S of the millimeter wave radar unit 15. Further, FIG. 3B is a diagram schematically illustrating the sections of the millimeter wave radar unit 15 and the shielding member 18.

In the present embodiment, on the side of the front surface of the millimeter wave radar unit 15, a shielding member 18 is provided such that the shielding member 18 is placed with a gap from the antenna surface 15S of the millimeter wave radar unit 15, and covers the entire surface of the antenna surface 15S when viewed from the normal-line direction AX2 of the antenna surface 15S. Preferably, the shielding member 18 is larger than the antenna surface 15S when viewed from the normal-line direction of the antenna surface 15S.

More preferably, the size and the position of the shielding member 18 are set so as to have a positional relationship with the entire surface of the antenna surface 15S such that an electromagnetic wave radiated in a direction inclined from the normal-line direction of the antenna surface 15S, e.g., the direction of 80°, passes through the shielding member 18. By doing so, there will be no phase difference or intensity discrepancy between the electromagnetic wave emitted in the normal-line direction of the antenna surface 15S and the electromagnetic wave radiated in the direction of, for example, 80°, thus making it possible to accurately detect the information such as the position of an object. The shielding member 18 may be provided in contact with the antenna surface 15S.

The shielding member 18 is formed, for example, in the shape of a parallel flat plate having a constant thickness, and the normal line thereof is set according to the angular range of the radiation pattern of the antenna. The shielding member 18 shaped like a parallel flat plate is preferably placed so as to be perpendicular to the central axis or the reference axis of the radiation pattern of the antenna. Alternatively, the shielding member 18 is preferably placed so as to be perpendicular to the radiation surface of the antenna.

The radiation pattern of the antenna mentioned here refers to the angular distribution of the intensity of an electromagnetic wave transmitted from the antenna surface 15S of the millimeter wave radar unit 15, and generally has a distribution in which a maximum intensity is in the normal-line direction of the antenna surface 15S and the electromagnetic wave intensity decreases as the angle from the normal-line direction increases. The angle at which an intensity of −3 dB is reached from the maximum intensity is referred to as the half width of an antenna pattern, and is, for example, 80°.

Figure 3C:
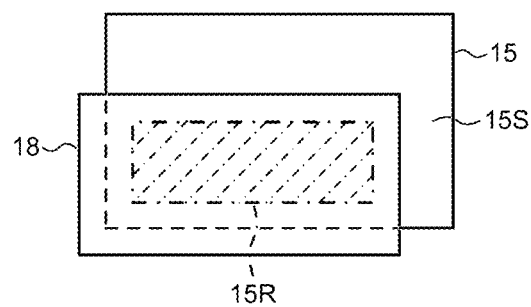
FIG. 3C is a diagram illustrating the shielding member 18 that covers an entire electromagnetic wave transmitting/receiving area 15R, which is a partial area of the front surface of the millimeter wave radar unit 15.

As illustrated in FIG. 3C, in the case where the antenna of the millimeter wave radar unit 15 is provided in a partial area of the front surface of the millimeter wave radar unit 15 and the millimeter waves are radiated and received in that area, the shielding member 18 may be provided to cover the whole area of the electromagnetic wave transmitting/receiving area (hereinafter referred to as the antenna beam area) 15R, which is at least that partial area.

In this case, an area other than the antenna beam area 15R (i.e., the area not shielded by the shielding member 18) of the front surface (the antenna surface 15S) of the millimeter wave radar unit 15 is ideally covered by another extension. Alternatively, the area not shielded by the shielding member 18 can be made difficult to be visually recognized from the outside by the light guide body 16B itself of the light emitting unit 16 or by using the DRL from the light guide body 16B or the light emission of the turn lamp.

Effective shielding and excellent design shielding can be achieved by covering the area other than the antenna beam area 15R in the front surface of the millimeter wave radar unit 15 by another extension.

Figure 4:
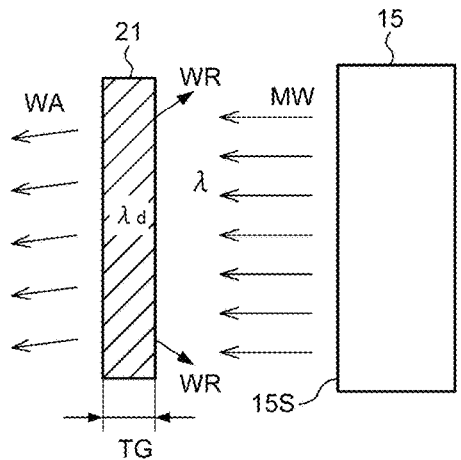
FIG. 4 is a sectional view illustrating a case where the shielding member is placed in front of the antenna surface 15S of the millimeter wave radar unit 15.

FIG. 4 is a sectional view illustrating a case where the shielding member is placed in front of the antenna surface 15S of the millimeter wave radar unit 15. More specifically, FIG. 4 schematically illustrates a case where millimeter waves MW (wavelength k) radiated from the millimeter wave radar unit 15 pass through a shielding member 21 (thickness TG) made of a resin or the like. The millimeter waves MW are partly reflected (reflection waves WR) by the shielding member 21, and the millimeter waves passing through the shielding member 21 are absorbed and attenuated by the shielding member 21, and radiated to the outside (transmitted millimeter waves WA).

Figure 5:
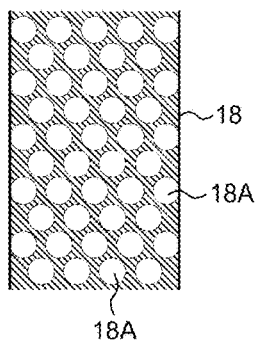
FIG. 5 is a partially enlarged sectional view illustrating an enlarged part of the section of the shielding member 18 of the present embodiment.

FIG. 5 is a partially enlarged sectional view illustrating an enlarged part of the section of the shielding member 18 of the present embodiment. FIG. 5 schematically illustrates that the shielding member 18 is composed of a foamed resin.

The shielding member 18 is made of a foamed resin. The shielding member 18 is formed by sealing carbon dioxide gas or the like in a transparent resin such as polycarbonate, acrylic, polyimide, or epoxy to create bubbles 18A in the resin. Since the gas is sealed in the resin, it is possible to reduce a dielectric constant and significantly reduce the influence on electromagnetic waves. If the bubble rate (the ratio of bubbles to a total volume) of the foamed resin is 50% or more, then the influence of the resin can be almost ignored.

The relative permittivity and the dielectric loss of the foamed resin can be measured by using a measurement method such as a waveguide S parameter method or a free space S parameter method. Although it is better to perform actual measurement for higher accuracy, the relative permittivity and the dielectric loss can be expressed by the following equations for a simple estimation. Based on the A. S. Windeler's formula, the relative permittivity of air was defined as 1.

$$(\varepsilon r - \varepsilon a)/(\varepsilon r - 1) F/100 \times 3\varepsilon a/(2\varepsilon a + 1)$$

$$\tan \delta' = \tan \delta \times F/100$$

Here, $\varepsilon a$ denotes the relative permittivity of a foamed resin, $\varepsilon r$ denotes the relative permittivity of a resin, F denotes bubble rate (%), $\tan \delta'$ denotes the dielectric loss tangent of the foamed resin, and $\tan \delta$ denotes the dielectric loss tangent of the resin.

If the difference in dielectric constant between a shielding member and air is large, then the radiated electromagnetic waves emitted from a millimeter wave radar are reflected by the shielding member. Further, due to the influence of the dielectric loss of the shielding member, the radiated electromagnetic waves from the millimeter wave radar are absorbed and turned into heat in the shielding member. For these reasons, if the shielding member is placed in front of the antenna surface of the millimeter wave radar, then there will be a problem in that the intensity of radiated electromagnetic waves decreases or the radiation direction of radiated electromagnetic waves (antenna pattern) inconveniently changes due to a difference in dielectric constant between the shielding member and air.

When the frequency of millimeter waves used for a millimeter wave radar is denoted by f (Hz), a wavelength $\lambda$ (m) in the space at that frequency will be as follows:

$$\lambda = c/f (c:\text{light speed})$$

For example, if the frequency f is 79 GHz, then the wavelength $\lambda$ is 3.8 mm. When the wavelength in a resin (dielectric) is denoted by $\lambda d$, and the relative permittivity of the resin is denoted by $\varepsilon r$, then the wavelength in the resin is expressed by the following:

$$\lambda d = \lambda / \varepsilon r^{1/2}$$

Further, if the wavelength in the space is 3.8 mm, and the relative permittivity of a resin is 2.74, then the wavelength in the resin is 2.3 mm.

A distance D at which the power density of electromagnetic waves irradiated to a foamed resin decreases by half (power halving depth) is simply expressed by the following when the dielectric loss tangent of the foamed resin is denoted by $\tan \delta'$:

$$D(m) = 3.32 \times 10^7 / (f \times \varepsilon a^{1/2} \times \tan \delta')$$

For example, when a resin having a relative permittivity of 2.74 and a dielectric loss tangent of 0.026 is foamed and the volume ratio of the bubble rate reaches 50%, the relative permittivity ca of the foamed resin is 1.73 and the dielectric loss tangent $\tan \delta'$ is 0.013 from the above equations. For example, the power halving depth of an electromagnetic wave having a frequency of 79 GHz will be as follows.

$$D(m) = 3.32 \times 10^7 / (79 \times 10^9 \times 1.73^{1/2} \times 0.013) = 24.5 \text{(mm)}$$

On the other hand, if a resin is not foamed, then the thickness at which power is halved will be as follows:

$$D(m) = 3.32 \times 10^7 / (79 \times 10^9 \times 2.74^{1/2} \times 0.026) = 9.8 \text{(mm)}$$

In other words, if a resin is foamed with the volume ratio of bubble rate of 50%, then the thickness for the power halving depth will be approximately 2.5 times.

Further, if a resin contains a carbon-based black pigment such as carbon, the absorption of electromagnetic waves increases. Therefore, a black-based pigment for a shielding material to be contained in the shielding member 18 is preferably an oxide of iron (e.g., magnetite-type triiron tetroxide), a composite oxide of copper and chromium, or a composite oxide of copper, chromium and zinc. This reduces the absorption of electromagnetic waves, as compared with a carbon-based black pigment. Meanwhile, the extension portions other than the shielding member 18 can increase the absorption of electromagnetic waves by increasing the carbon content, thus making it possible to suppress multiple reflection. In the case where carbon must be used for the shielding member 18 due to design requirements, the absorption of electromagnetic waves can be reduced by setting the carbon content to a ratio of 3% or less by weight.

Further, the shielding member 18 of the present embodiment is made of a foamed resin and contains bubbles, so that light scattering therein is large, thereby providing a greater shielding effect by itself than that of a resin containing no bubbles. Consequently, by using the above-mentioned shielding material that absorbs less electromagnetic waves, a greater shielding effect and a greater effect for reducing the absorption of electromagnetic waves can be obtained with a smaller amount of a black-based pigment.

Here, the thickness of the dielectric of the shielding member 18 or the like is selected as described below. When the thickness of the dielectric through which electromagnetic waves pass is denoted by TG, if a reflection loss is equal to or more than a passage loss (reflection loss≥passage loss), then the thickness is ideally as shown below:

$TG = n \times \lambda d/2$ (n:natural number)

If the thickness TG is set to an integer multiple of λd/2, then the passage loss also increases, so that an integer value that satisfies the condition indicated by reflection loss≥passage loss is preferably used.

Even if TG does not completely agree with n×λd/2 (n: natural number), no practical problem will occur if the thickness is set such that TG falls in a frequency band in which the reflection loss of power with respect to the frequency f is, for example, −10 dB or less (the reflection power being 10% or less). Such a range of the thickness TG can be derived by setting a conditional expression in which the value of a reflection loss $S_{11}$ is −10 dB or less by using, for example, an S parameter method, and obtaining a solution on the thickness TG.

[Math. 1]
$$S_{11} = \frac{\Gamma(1-z^2)}{1-\Gamma^2 z^2} \leq -10 dB \quad (1)$$

[Math. 2]
$$\Gamma = \frac{(\gamma_0 - \gamma)}{(\gamma_0 + \gamma)} \quad (2)$$

[Math. 3]
$$z = \exp(-\gamma \cdot TG) \quad (3)$$

[Math. 4]
$$\gamma_0 = j\sqrt{\left(\frac{\omega}{c_{air}}\right)^2 - \left(\frac{2\pi}{\lambda_c}\right)^2} \quad (4)$$

[Math. 5]
$$\gamma = j\sqrt{\frac{\omega^2 \varepsilon_r}{c_{vac}^2} - \left(\frac{2\pi}{\lambda_c}\right)^2} \quad (5)$$

($C_{air}$: light speed in the air; $C_{vac}$: light speed in vacuum; w: angular frequency of electromagnetic wave (=2×π×f [Hz]); $\varepsilon_r$: complex dielectric constant of dielectric; and $\lambda_c$: cutoff wavelength (indicating upper limit of wavelength propagated by basic mode, and determining the minimum operating frequency of a transmission line. In coaxial lines, $\lambda_c = \infty$)).

Further, the range of an allowable thickness TG may be determined to be an appropriate value by experimentally evaluating the dependence of reflection loss on the thickness TG (e.g., a value at which the reflection loss is −10 dB or less). If the reflection loss is −10 dB or more, a failure of equipment may occur.

Further, in the case where the reflection loss is below the passage loss (reflection loss<passage loss), the millimeter wave radar can be used with no problem by setting the thickness TG of the dielectric to a thickness equal to or less than the power halving depth.

As described above, by using a foamed resin as a shielding member on the front surface (the antenna surface) of a millimeter wave radar, it is possible to make the millimeter wave radar visually unrecognizable from the front of a light fixture and to suppress the attenuation of the electromagnetic waves of the millimeter wave radar.

Modified Example

Figure 6:
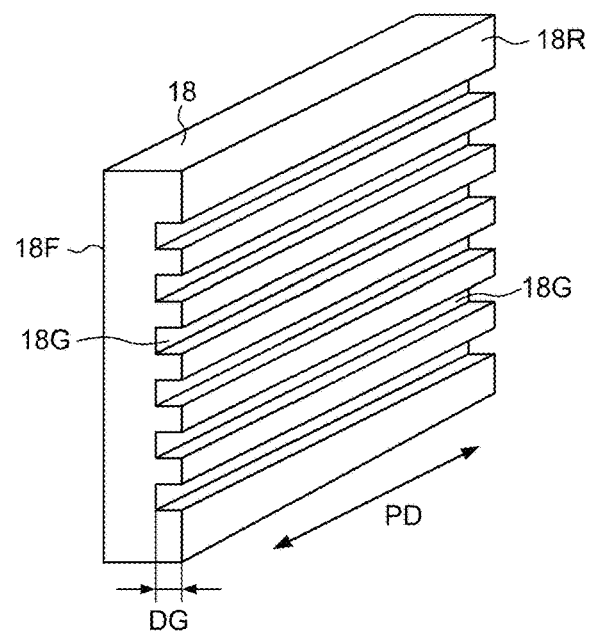
FIG. 6 is a perspective view schematically illustrating a shielding member 18, which is a modified example of the present embodiment.

FIG. 6 is a perspective view schematically illustrating a shielding member 18, which is a modified example of the present embodiment. Rectangular grooves 18G are formed in one surface of the shielding member 18.

More specifically, a plurality of grooves 18G having rectangular sections are provided in parallel to each other at constant intervals in a surface 18R of the shielding member 18 (the rear surface of the shielding member 18) that is opposed to an antenna surface 15S of a millimeter wave radar unit 15.

When the wavelength of millimeter waves from the millimeter wave radar unit 15 (in the air) is denoted by λ0, a depth DG of the grooves 18G is set to be DG=k×λ0/4 (k: natural number). Further, the grooves 18G are formed to be parallel to a polarization plane PD of millimeter waves from the millimeter wave radar unit 15. Alternatively, the shielding member 18 is placed in parallel to the polarization plane PD of millimeter waves.

By configuring the shielding member 18 as described above, the reflection of the millimeter waves from the millimeter wave radar unit 15 is significantly reduced due to the offset of reflected waves and incident waves at a rear surface 18R of the shielding member 18. Therefore, according to the present modified example, the reflection of radar waves can be further suppressed, thus making it possible to provide a highly accurate lamp device with less radar function loss.

Figure 7:
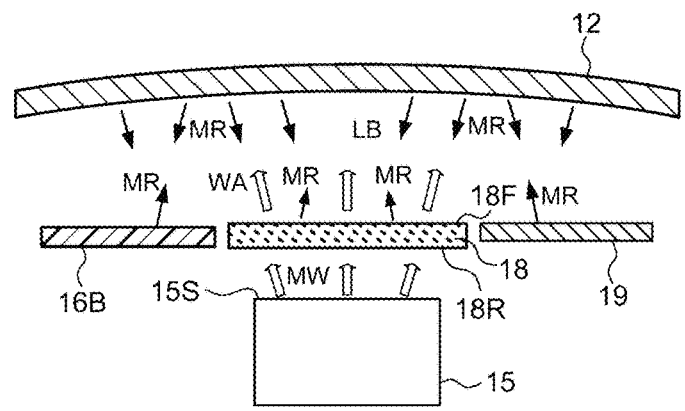
FIG. 7 is a diagram for explaining the reflection suppression effect by the shielding member 18 of the present embodiment.

FIG. 7 is a diagram for explaining that the shielding member 18 of the present embodiment and the modified example (hereinafter referred to as the present embodiment) exhibits a great reflection suppression effect.

More specifically, some of the millimeter waves radiated from the millimeter wave radar unit 15 and passed through the shielding member 18 are reflected by a transparent cover 12. The electromagnetic waves reflected by the transparent cover 12 are reflected by the shielding member 18, a light guide body 16B of a light emitting unit 16 and another extension 19, generating multiple reflection waves MR. Such multiple reflection waves MR disturb not only transmission signals but also reception signals, and generate noises, thus deteriorating a dynamic range and accuracy.

However, the shielding member 18 of the present embodiment has a small relative permittivity, so that the reflectance of the millimeter waves on a front surface 18F of the shielding member 18 is low, thus suppressing the reflection. This cumulatively reduces the influence of the multiple reflection. In addition, the absorption loss of the shielding member 18 is also reduced, so that it is possible to provide a lamp device having small noise, a large dynamic range, and a highly accurate radar function.

Figure 8A:
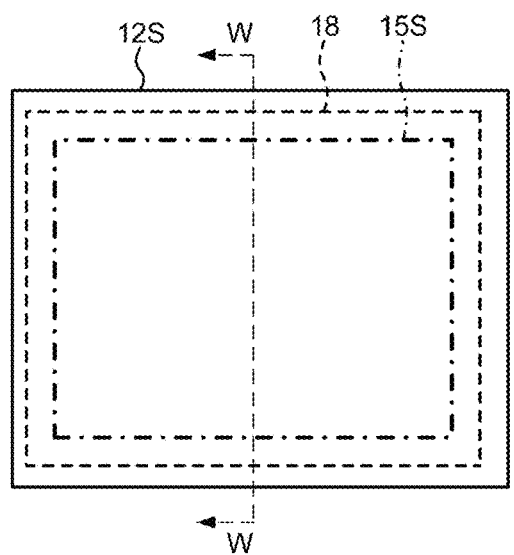
FIG. 8A is a plan view schematically illustrating the placement configuration of a millimeter wave radar unit 15, a shielding member 18, and a transparent cover 12 in another embodiment of the present invention.

FIG. 8A is a diagram schematically illustrating the placement configuration of a millimeter wave radar unit 15, a shielding member 18, and a transparent cover 12 in another embodiment of the present invention. This is a view from the front side (the vertical direction) of the antenna surface (the radar wave radiation surface) 15S of a transmitting/receiving antenna 15A of the millimeter wave radar unit 15.

Figure 8B:
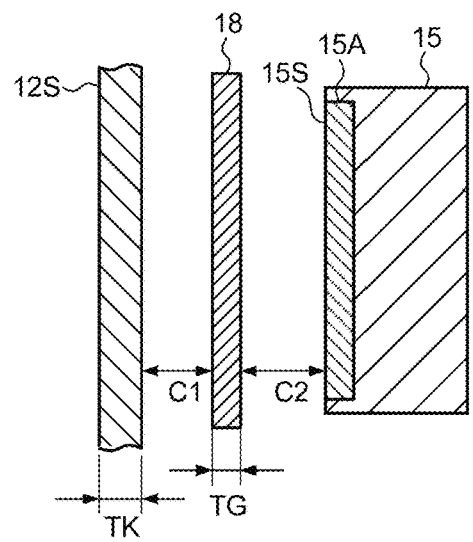
FIG. 8B is a sectional view schematically illustrating the placement configuration of the millimeter wave radar unit 15, the shielding member 18, and the transparent cover 12 viewed from line W-W in FIG. 8A.

FIG. 8B is a sectional view schematically illustrating the placement configuration of the millimeter wave radar unit 15, the shielding member 18, and the transparent cover 12, which are viewed from line W-W in FIG. 8A.

As illustrated in FIG. 8B, a shielding member 18 shaped like a parallel, flat plate is placed in front of the antenna surface 15S of the millimeter wave radar unit 15 with a constant interval C2 therebetween. The shielding member 18 has a thickness TG.

For example, the shielding member 18 is configured as a plate-like body having a parallel flat plate shape and a substantially constant layer thickness, and both surfaces are placed in parallel to the antenna surface 15S of the millimeter wave radar unit 15. The shielding member 18 is formed by forming a resin such as polycarbonate, acrylic, epoxy, or polyimide into a plate-like shape.

Further, the shielding member 18 and the millimeter wave radar unit 15 are placed such that the interval between the shielding member 18 and the transparent cover 12 is a constant interval C 1. The transparent cover 12 is formed as a light-transmitting cover of a transparent resin or the like. The transparent cover 12 may alternatively be translucent such as being colored as long as the transparent cover 12 transmits light.

The transparent cover 12 may have a curved shape as a whole, or may have a portion having a different thickness. However, when viewed from a direction perpendicular to the antenna surface 15S (hereinafter also referred to as the vertical view), an area 12S of the transparent cover 12 (hereinafter also referred to as a radiation surface correspondence area) that overlaps the antenna surface 15S (the electromagnetic wave radiation surface) preferably has a parallel flat plate shape having a constant thickness.

The shielding member 18 is configured to be sized and placed in such a manner as to cover the entire surface of the antenna surface 15S when viewed from a direction perpendicular to the antenna surface 15S of the millimeter wave radar unit 15.

As illustrated in FIG. 8A and FIG. 8B, the area 12S on the front of the transparent cover 12, the shielding member 18, and the antenna surface 15S are placed in such a manner as to be parallel to each other.

The transparent cover 12 is preferably configured to be sized and placed such that the area (the radiation surface correspondence area) 12S of the transparent cover 12 that overlaps the antenna surface 15S covers the entire surface of the antenna surface 15S when viewed from the direction perpendicular to the antenna surface 15S.

[Interval Between and Thicknesses of the Shielding Member 18 and the transparent cover 12]

The shielding member 18 and the transparent cover 12 placed on the front surface side (the antenna surface 15S side) of the millimeter wave radar unit 15 are made of, for example, resins as described above, and the dielectric constants thereof cause reflection of electromagnetic waves due to a difference in dielectric constant between the resin and air at the interface between the resin and a space.

At that time, if the phase of transmitted electromagnetic waves and the phase of reflected electromagnetic waves are in directions canceling each other, then the transmitted electromagnetic waves attenuate due to the synthesis with the reflected electromagnetic waves.

More specifically, in the present specification, the frequency f (Hz) of the millimeter wave radar is, for example, 76 GHz to 81 GHz. If the frequency f (Hz) is, for example, 79 GHz, then the wavelength $\lambda 0$ (in the air) is 3.8 mm.

For example, when a relative permittivity of the transparent cover 12 (dielectric) is $\varepsilon r1=2.4$, the wavelength $\lambda d$ in the transparent cover 12 is 2.45 mm, and when a relative permittivity of the shielding member 18 is $\varepsilon r2=1.73$, the wavelength $\lambda d$ in the shielding member 18 is 2.89 mm.

The radiation surface correspondence area 12S of the transparent cover 12, the shielding member 18, and the antenna surface 15S of the millimeter wave radar unit 15 are provided such that the relationship given below is satisfied when the thickness of the radiation surface correspondence area 12S of the transparent cover 12 is denoted by TK and the relative permittivity thereof is denoted by $\varepsilon r1$, the wavelength (effective wavelength) in a resin (medium) is denoted by $\lambda d1$, the thickness of the shielding member 18 is denoted by TG and the relative permittivity thereof is denoted by $\varepsilon r2$, and the effective wavelength in the resin (medium) is $\lambda d2$. In the following expressions, C1 denotes the interval between the radiation surface correspondence area 12S and the shielding member 18, C2 denotes the interval between the shielding member 18 and the antenna surface 15S (electromagnetic wave radiation surface), and n1, n2, m1, and m2 denote natural numbers.

$$TK = n1 \times \lambda d1/2 \quad (6)$$

$$TG = n2 \times \lambda d2/2 \quad (7)$$

$$C1 = m1 \times \lambda/2 \quad (8)$$

$$C2 = m2 \times \lambda/2 \quad (9)$$

Thus, by appropriately selecting the thickness TK of the radiation surface correspondence area 12S and the thickness TG of the shielding member 18, the reflection loss of electromagnetic waves that occurs at the interface between the transparent cover 12 and a space and the interface between the shielding member 18 and the space can be reduced. In other words, not only the multiple reflection between the shielding member 18 and the antenna surface 15S (electromagnetic wave radiation surface) but also the multiple reflection between the radiation surface correspondence area 12S of the transparent cover 12 and the shielding member 18 can be suppressed. Therefore, these synergistic multiple reflections can be effectively suppressed. In addition, changes in an electromagnetic wave radiation pattern can be reduced.

In other words, as described above, the lamp device of the present example can solve the problem in that the reflected electromagnetic waves between the transparent cover 12 and the shielding member 18 are further subjected to multiple reflection between the transparent cover 12 and the shielding member 18, thus increasing noise.

Further, it is possible to solve the problem in that the reflected electromagnetic waves that have strayed into the space between the transparent cover 12 and the shielding member 18 are subjected to multiple reflection between the transparent cover 12 and the shielding member 18, thus increasing noise.

When the thicknesses TK and TG are increased, the transmission loss increases due to the dielectric loss tangent of a resin. Preferably, therefore, n1=2 to 4 is applied to the thickness TK, and n2=2 or 3 is applied to the thickness TG.

Further, the radiation surface correspondence area 12S of the transparent cover 12 and the shielding member 18 may be slightly bent due to vibration during use of the lamp device 10, environmental temperatures, and the like. Although the transmission and reflection characteristics are slightly changed by the bending, it is preferable that the intervals C1 and C2 are not too small in order to suppress an average characteristic change in the entire surfaces of the radiation surface correspondence area 12S and the shielding member 18. Both the radiation surface correspondence area 12S and the shielding member 18 can be bent, so that the interval C1 is preferably larger than the interval C2 (m1<m2).

Further, it is preferable that the intervals C1 and C2 are not too large, because reflected electromagnetic waves from other members (the extensions or the like) in the lamp device stray into the space between the intervals C1 and C2, causing noise.

Considering the above, m1≥4 and m2≥2 are preferable, and 4≤m1≤8 and 2≤m2≤4 are more preferable.

Even if TK, TG, C1 and C2 do not completely satisfy the relational expressions given above, multiplex reflection can be extremely effectively suppressed by setting the above to fall within a frequency band in which the reflection loss of power with respect to the frequency f is −10 dB or less (the reflected power being 10% or less).

Such a range of TK, TG, C1 and C2 can be derived by setting a conditional expression such that the value of a reflection loss S11 is −10 dB or less by using, for example, the aforesaid S parameter method, and obtaining solutions on TK, TG, C1 and C2. The calculations can be performed by referring to the dielectric constant of each material for TK and TG, and to the dielectric constant of air for C1 and C2. Further, the dependence of the reflection loss on TK, TG, C1 and C2 may be experimentally evaluated to determine appropriate values (e.g., values at which the reflection loss is −10 dB or less).

DESCRIPTION OF REFERENCE NUMERALS

10: lamp device
11: base body
12: transparent cover
14: lamp unit
15: millimeter wave radar unit
15S: antenna surface
15R: electromagnetic wave transmitting/receiving area
16: light emitting unit
16A: light source
16B: light guide body
18: shielding member
18A: bubble
19: extension

The invention claimed is:

1. A lamp device comprising:
a lamp unit;
a radar unit having an antenna; and
a shielding member which covers at least a part of a front surface of the radar unit where the antenna is provided, and which is made of a foamed resin.

2. The lamp device according to claim 1, wherein the shielding member contains at least one of an oxide of iron, a composite oxide of copper and chromium, and a composite oxide of copper, chromium and zinc.

3. The lamp device according to claim 1, wherein the shielding member contains carbon in a content of 3% or less.

4. The lamp device according to claim 1, wherein the shielding member covers the entire front surface of the radar unit.

5. The lamp device according to claim 1, wherein the shielding member covers at least an electromagnetic wave transmitting/receiving area of the front surface of the radar unit.

6. The lamp device according to claim 1, including a light emitting body or a light guide body that covers an area other than the electromagnetic wave transmitting/receiving area in the front surface of the radar unit.

7. The lamp device according to claim 1, wherein the shielding member has a plurality of grooves which have rectangular sections and are provided, in a surface opposed to the front surface of the radar unit, in such a manner as to be parallel to a radiated electromagnetic wave polarization plane of the radar unit, and a depth DG of the plurality of grooves satisfies DG=k×λ0/4 (k: natural number) in the case where a wavelength of the radiated electromagnetic wave of the radar unit in the air is denoted by λ0.

8. The lamp device according to claim 1, wherein the shielding member has a thickness equal to or less than a power halving depth of a radiated electromagnetic wave of the radar unit.

9. A lamp device having a lamp unit, a radar unit that radiates an electromagnetic wave, and a transparent cover, the lamp device comprising:
a shielding member which is placed between the transparent cover and an electromagnetic wave radiation surface of the radar unit, covers at least a part of a front surface of the radar unit, and is made of a foamed resin;
wherein a thickness TK of an electromagnetic wave radiation surface correspondence area that corresponds to the electromagnetic wave radiation surface of the transparent cover is set such that a reflection loss of the electromagnetic wave incident upon the electromagnetic wave radiation surface correspondence area of the transparent cover is −10 dB or less,
a thickness TG of the shielding member is set such that a reflection loss of the electromagnetic wave incident upon the shielding member is −10 dB or less, and
an interval C1 between the electromagnetic wave radiation surface correspondence area and the shielding member is set such that the reflection loss of the electromagnetic wave incident upon the electromagnetic wave radiation surface correspondence area and the shielding member is −10 dB or less.

10. The lamp device according to claim 9, wherein an interval C2 between the shielding member and the electromagnetic wave radiation surface is set such that the reflection loss of the electromagnetic wave incident upon the shielding member from a space between the shielding member and the electromagnetic wave radiation surface is −10 dB or less.

11. The lamp device according to claim 10, wherein the electromagnetic wave radiation surface correspondence area, the shielding member, and the electromagnetic wave radiation surface are provided such that TK, TG, C1 and C2 satisfy relational expressions given below in the case where a wavelength of the electromagnetic wave in a space is denoted by $\lambda$, an effective wavelength in the electromagnetic wave radiation surface correspondence area is denoted by $\lambda d1$, and an effective wavelength of the shielding member is denoted by $\lambda d2$ (n1, n2, m1, and m2 being natural numbers):

$$TK = n1 \times \lambda d1/2 \qquad (6)$$

$$TG = n2 \times \lambda d2/2 \qquad (7)$$

$$C1 = m1 \times \lambda/2 \qquad (8)$$

$$C2 = m2 \times \lambda/2 \qquad (9).$$

12. The lamp device according to claim 11, wherein the n1 satisfies 2 to 4, and the n2 satisfies 2 or 3.

13. The lamp device according to claim 11, wherein the m1 and m2 satisfy m1≥4 and m2≥2.

* * * * *